United States Patent [19]

Parrish

[11] 3,947,551

[45] Mar. 30, 1976

[54] AMMONIA SYNTHESIS

[75] Inventor: Roger W. Parrish, Pittsburgh, Pa.

[73] Assignee: The Benfield Corporation, Berwyn, Pa.

[22] Filed: May 29, 1974

[21] Appl. No.: 474,232

[52] U.S. Cl. ............... 423/359; 423/228; 423/652; 23/260
[51] Int. Cl.² .......................................... C01C 1/04
[58] Field of Search ........... 423/359, 360, 361, 362, 423/363, 437, 228, 229, 650, 651, 652, 653, 654, 655, 656; 23/260; 260/449 M

[56] References Cited
UNITED STATES PATENTS

| | | | |
|---|---|---|---|
| 2,487,981 | 11/1949 | Reed | 423/437 |
| 3,382,045 | 5/1968 | Habermehl et al. | 423/437 |
| 3,577,221 | 5/1971 | Smith et al. | 423/656 |

FOREIGN PATENTS OR APPLICATIONS

| | | | |
|---|---|---|---|
| 1,104,628 | 1968 | United Kingdom | 423/361 |
| 1,501,226 | 1967 | France | 423/655 |
| 1,076,633 | 1960 | Germany | 423/655 |
| 1,117,091 | 1961 | Germany | 423/655 |

OTHER PUBLICATIONS
Trans. Instr. Chem. Engrs., Correlation of Abs. Rates of $CO_2$ by Alkaline & Amine Solutions in Packed Columns, Vol. 38, 1960, pp. 216–224.

Primary Examiner—Oscar R. Vertiz
Assistant Examiner—Eugene T. Wheelock
Attorney, Agent, or Firm—William M. Epes

[57] ABSTRACT

An improved ammonia synthesis train utilizing hydrocarbon starting materials which are converted to hydrogen under superatmospheric pressure in a series of steps which include conversion of the hydrocarbons to hydrogen-carbon monoxide mixtures, shift conversion of the carbon monoxide to hydrogen and $CO_2$, and removal of the $CO_2$. In such a system, reduction in process gas losses is achieved through an improved arrangement and integration of the shift conversion and $CO_2$ removal steps. The carbon monoxide is first shifted in a series of shifts including a final low temperature shift; the bulk of the $CO_2$ is removed by an essentially isothermal hot potassium carbonate $CO_2$ removal system; the small residual amount of carbon monoxide is shifted to very low levels in a final low temperature shift; and the small amount of residual $CO_2$ is then removed to very low levels in a second non-isothermal scrubbing system employing an aqueous solution of a chemical absorbent. Methanation, compression and ammonia synthesis follows. Losses of process gas in the methanation step and in the purge gas from the ammonia loop are sharply reduced with concomitant high thermal efficiency.

12 Claims, 1 Drawing Figure

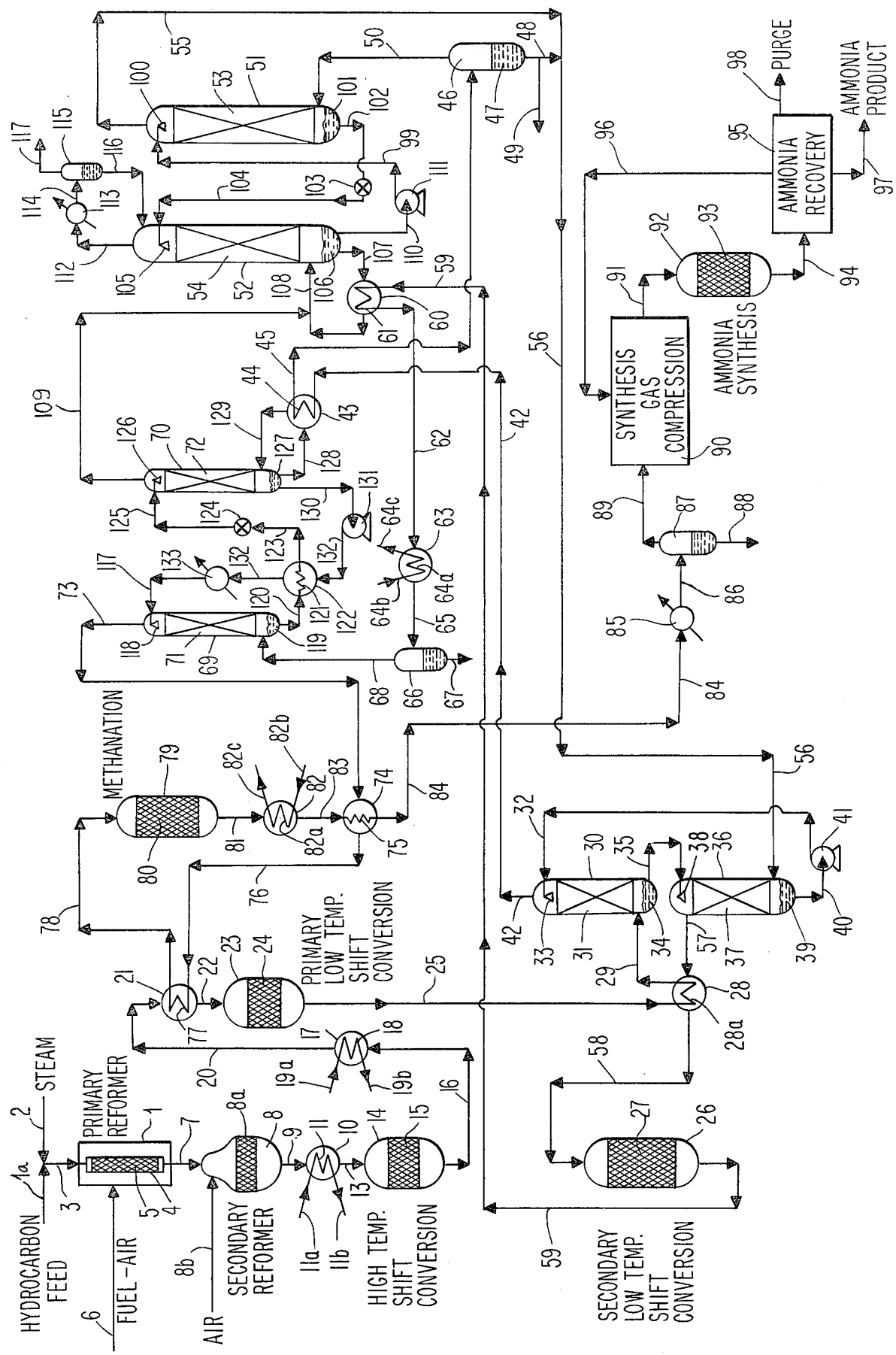

AMMONIA SYNTHESIS

BACKGROUND OF THE INVENTION AND PRIOR ART

This invention relates to improvement in ammonia synthesis trains.

In current practice almost all synthetic ammonia is produced with the use of hydrocarbon feedstocks to furnish the source of the hydrogen required in the catalytic synthesis step, the necessary nitrogen being derived from air.

To minimize compression costs, the hydrogen is produced from the hydrocarbon feedstocks by reforming or partial oxidation at elevated pressures of, e.g., from 100 to 1500 psig (pounds per square inch gage). Reforming or partial oxidation produces a mixture of hydrogen and carbon monoxide which is then treated to convert the carbon monoxide to hydrogen and $CO_2$ by the so-called shift reaction after which the $CO_2$ is removed prior to ammonia synthesis. Depending upon the process route chosen (i.e., reforming or partial oxidation), the required nitrogen is added to the hydrogen either prior to carbon monoxide shift and $CO_2$ removal or following these steps. Using reforming, the nitrogen is introduced by adding air during the reforming operation, whereas in partial oxidation trains, the nitrogen is added to the hydrogen following $CO_2$ removal and prior to compression to ammonia synthesis pressures.

In such ammonia synthesis trains, the final production cost of the synthetic ammonia is almost entirely a function of the capital costs of the plant and the cost of the hydrocarbon feed. Both of these factors are importantly affected by the capital cost and the efficiency of the systems used for shift conversion of carbon monoxide to hydrogen and the removal of carbon dioxide. This invention is concerned with improvements in the arrangement of the carbon monoxide shift system and the $CO_2$ removal system and the manner in which these systems are integrated so as to provide an integrated system which is low in capital cost and high in thermal efficiency and which minimizes process gas losses in the ammonia synthesis train.

Currently, the most commonly used ammonia synthesis process employs gaseous or light liquid hydrocarbons as feedstocks and steam reforming processing. The hydrocarbon feed together with steam is treated over a reforming catalyst at temperatures generally ranging from 1000° to 1500°F and pressures generally ranging from 100 to 600 psig. The nitrogen in the proper ratio required in the ammonia synthesis reaction is added in the form of air in a secondary reforming step. The carbon monoxide-hydrogen mixture produced by reforming is then treated in a series of so-called shift conversion steps to convert the carbon monoxide to hydrogen and $CO_2$. The process stream, now consisting essentially of hydrogen, nitrogen and $CO_2$, is treated for the removal of $CO_2$ following which small residual amounts of CO and $CO_2$ are removed usually by a methanation step which converts the residual CO and $CO_2$ into methane by reaction with hydrogen contained in the gas over a methanation catalyst. The process gas is then cooled and compressed to ammonia synthesis pressures of, e.g., 2000 to 8000 psig.

After contact with the ammonia synthesis catalyst, ammonia is recovered from the process gas and unconverted synthesis gas is recycled in the so-called ammonia recycle loop to be retreated over the ammonia synthesis catalyst. Because of this recycle operation, inert materials (mainly methane and argon) tend to build up in the recycle loop. In order to maintain the concentration of these inerts at a reasonable level in the recycle loop, it is necessary to continuously purge a portion of the recycled gas from the loop at a rate which will keep the inerts at a constant tolerable level. The purge gas consists mainly of hydrogen and nitrogen together with some unrecovered ammonia and these inerts, and has little value except as a waste fuel gas. The loss of hydrogen and ammonia in the recycle loop purge gas can represent a substantial loss of the total potential yield of ammonia.

In ammonia trains based on the steam reforming of gaseous or light liquid hydrocarbon feedstocks, the most common procedure is to use two stages of carbon monoxide shift conversion in order to reduce the residual carbon monoxide in the synthesis gas to a relatively low level. In the first stage, the bulk of the carbon monoxide is converted in a so-called high temperature shift converter normally employing an iron oxide catalyst promoted with small amounts of another metal oxide such as chromium oxide at temperatures generally in the range of from 600° to 1000°F. The high temperature employed in the first shift conversion stage favors rapid reaction and thus minimizes the amount of catalyst required. On the other hand, the shift equilibrium constant, $K_p$ for the reversible shift reaction:

$$CO + H_2O \rightleftarrows CO_2 + H_2$$

is less favorable at higher temperatures. The equilibrium constant $K_p$ for the above shift reaction may be expressed as:

$$Kp = \frac{(H_2)(CO_2)}{(H_2O)(CO)}$$

where the parentheses indicate the partial pressure of the component designated within the parentheses at equilibrium. At high temperatures, the values for $K_p$ are relatively low, reflecting relatively lower degrees of conversion of carbon monoxide. Typically residual carbon monoxide content in high temperature shift effluent may be in the range of from 2.5 to 3.5% by volume (anhydrous basis).

Since it is uneconomic to leave relatively high concentrations of unconverted carbon monoxide in the synthesis gas (e.g., 2.5–3.5%), a second shift conversion stage is employed using a so-called low temperature shift catalyst, typically a reduced copper catalyst promoted with zinc oxide and generally operating at temperatures in the range of from 350° to about 550°F. In the second stage of conversion, the shift equilibrium $K_p$ is much more favorable and typically, the carbon monoxide can be reduced to residual levels of the order of 0.2–0.5% by volume (anhydrous basis) leaving the low temperature shift conversion stage.

The process gas, after having thus been treated successively in high temperature and low temperature shift conversion stages, now contains typically from 16 to about 25% $CO_2$ by volume (anhydrous basis). $CO_2$ removal is then carried out, usually by scrubbing with an alkaline liquid scrubbing agent such as an aqueous solution of potassium carbonate or of an ethanolamine to produce a gas containing generally less than 0.2% $CO_2$. The process gas now containing typically 0.3% carbon monoxide and .2% or less of carbon dioxide is then further treated over a methanation catalyst to convert the residual CO and $CO_2$ to methane by the following series of reactions:

$$CO + 3H_2 \rightarrow CH_4 + H_2O$$

$$CO_2 + 4H_2 \rightarrow CH_4 + 2H_2O$$

Note that for each mole of CO converted to methane, three moles of hydrogen are consumed and for every mole of $CO_2$ methanated, four moles of hydrogen are consumed. The hydrogen for the methanation reaction is of course supplied by the hydrogen in the process steam. For example, in a typical case where 0.3% CO and 0.2% $CO_2$ is methanated, there is a loss of approximately 2.3% of the total hydrogen in the synthesis gas. Even more significant than this substantial hydrogen loss in the methanation step, the conversion of the residual amounts of CO and $CO_2$ to methane substantially increases the inerts contents of the synthesis gas and very substantially raises the purge losses of hydrogen and ammonia in the recycle loop of the ammonia synthesis reactor. In the typical case discussed above, the methanation of the residual CO and $CO_2$ would introduce approximately 0.5% methane into the ammonia synthesis gas. This increased inerts content in a typical ammonia synthesis loop would result in hydrogen loss in the purge gas equal to approximately 5% of the total hydrogen. In most typical ammonia trains in current operation, losses of ammonia production due to these losses, i.e. loss of hydrogen in the methanation step, and loss of hydrogen and ammonia in the purge step, may run up to 10% or more of total ammonia production, equivalent in a large plant to losses of several million dollars a year in ammonia product.

There have been numerous suggestions for improving the efficiency of ammonia synthesis trains by introducing a $CO_2$ removal step between shift conversion stages in order to reduce the concentration of $CO_2$ entering the final shift conversion stage to a low level in order to achieve a high degree of conversion of the CO in the final shift. By reducing the concentration of $CO_2$ in the final shift conversion stage, more complete conversion of the CO is of course favored because of the reversible nature of the shift reaction. See, for example, U.S. Pat. No. 2,487,981 to Reed, U.S. Pat. No. 3,382,045 to Habermehl et al., and U.S. Pat. No. 3,577,221 to Smith et al. While a small number of commercial plants have employed a $CO_2$ removal step between stages of shift conversion, only minor advantages have been obtained in contrast to the increased cost and complexity of the $CO_2$ removal system, the necessary additional heat exchange equipment required, and the additional heat losses incurred as the process stream is alternately cooled and heated between successive shift conversion and $CO_2$ removal stages. As a consequence, the great majority of ammonia trains do not use between-shift $CO_2$ removal systems.

GENERAL DESCRIPTION OF INVENTION AND PREFERRED EMBODIMENTS

In accordance with the present invention a markedly improved arrangement and integration of the carbon monoxide shift system and the $CO_2$ removal system has been found which provides a sharp reduction in process gas losses, and which at the same time is low in capital cost and high in thermal efficiency. Generally stated, the invention involves the following sequence of process steps. The superatmospheric pressure mixture of hydrogen and carbon monoxide generated by reforming or partial oxidation of hydrocarbons is subjected to shift conversion in a series of at least two shift conversion stages, the first of which is a so-called high temperature shift conversion, and the last of which is a so-called low temperature shift conversion. In this series of shift conversion stages all but a small amount, viz. from 90 to 99% and preferably from 95 to 98% of the total carbon monoxide in the gas is converted to hydrogen and $CO_2$. There is no $CO_2$ removal between these shift conversion stages.

The process gas leaving the low temperature shift conversion stage, typically at a temperature of, e.g. 440°F, is then cooled by heat exchange and the thus cooled process gas is then subjected to a first stage of $CO_2$ removal using an aqueous solution of potassium carbonate wherein at least the major portion of the absorption is carried out at an absorption temperature in the vicinity of the atmospheric boiling temperature of the solution (typically 230°F), and wherein the regeneration of the potassium carbonate scrubbing solution is carried out at approximately atmospheric pressure by steam stripping. In this first essentially isothermal and relatively high temperature $CO_2$ removal step, the bulk of the total $CO_2$ generated in the ammonia synthesis train is removed with high thermal efficiency. The $CO_2$ content of the process gas is reduced to a residual level of not less than 0.1% by volume (anhydrous basis) and not more than 2% by volume (anhydrous basis) and preferably to a residual level of not less than 0.2% and not more than 1%.

The process gas stream, now containing only a small residual amount of carbon monoxide and a small residual amount of $CO_2$, and at a temperature of typically 210°F, is then heat exchanged to raise its temperature and subjected to a final stage of shift conversion using a low temperature shift conversion catalyst to convert all but a small amount of the residual carbon monoxide to hydrogen and $CO_2$. This final low temperature shift conversion should be carried out to produce a final treated gas containing not more than 0.1% and preferably not more than 0.05% by volume (anhydrous basis) of carbon monoxide.

The gas stream leaving the final low temperature shift, typically at a temperature of 410°F, is then cooled by heat exchange and the thus cooled process gas, now containing only a small amount of $CO_2$, is subjected to a second stage of $CO_2$ removal using an aqueous alkaline scrubbing solution, preferably an ethanolamine, in a nonisothermal cycle wherein the scrubbing is carried out at a relatively low temperature, typically 120°F, with the regeneration occurring by steam stripping at about the solution boiling temperature. While the thermal efficiency of the second $CO_2$ removal stage is much lower than the first stage, in the second stage the $CO_2$ is effectively reduced to very low values of not more than 200 ppm (parts per million) by volume and preferably not more than 100 ppm (anhydrous basis). Since only a minor proportion of the $CO_2$ is removed in the second stage and because the permissible exit $CO_2$ from the hot potassium carbonate scrubbing system is greater than allowable if it were the only $CO_2$ removal system in the process train, the average thermal efficiency of the two $CO_2$ removal stages is higher than would be possible using either system alone. The gas stream leaving the second $CO_2$ removal stage, now containing very small residual amounts of CO and $CO_2$, is then subjected to methanation in conventional fashion to convert such small residual amounts to methane, after which the gas is cooled, compressed and converted to ammonia over an ammonia synthesis catalyst in normal fashion, including a recycle loop with provision for the purging of inerts. As will be illustrated by the example which follows, the reduction of hydrogen losses in the methanation step and in the purge from the recycle loop achieved by this sequence of steps permits increases in ammonia production of the order of 10% from a given quantity of hydrocarbon feed compared to current practice.

In order to achieve these highly important savings without suffering offsetting disadvantages of lowered thermal efficiency and substantially increased capital costs for the CO shift and $CO_2$ removal systems, it is essential to adhere to the sequence and choice of the shift conversion and $CO_2$ removal systems as described herein.

It is essential in the practice of the invention that the first series of shift conversion steps are carried out such that from 90 to 99%, and preferably from 95 to 98% of the carbon monoxide content of the process gas is converted to hydrogen and $CO_2$. This is critical for the following reasons. Firstly, the CO left in the gas after the first series of shift conversions must be shifted in the final low temperature shift converter. The higher the concentration of CO entering the final shift converter, the higher the concentration of $CO_2$ generated during the final shift, and the presence of such $CO_2$ has an increasingly adverse effect on the completeness of the reversible CO conversion reaction. Secondly, the $CO_2$ generated during the final shift conversion must be removed in the second $CO_2$ removal stage, which is thermally inefficient compared to the much higher thermal efficiency of the first isothermal $CO_2$ removal stage, thus adversely affecting the overall thermal efficiency of $Co_2$ removal. Thirdly, if the CO concentration in the gas entering the final low temperature shift conversion stage is high, then additional steam, not otherwise required, must be added to the process gas stream to supply that necessary to react with and convert such CO to $H_2$ and $CO_2$.

The use of the essentially isothermal, relatively high temperature $CO_2$ removal system employing aqueous hot potassium carbonate as the absorbent to absorb all but a minor portion of the total $CO_2$ from the process gas between two stages of low temperature shift conversion, coupled with the use of a non-isothermal scrubbing system for final $CO_2$ cleanup is similarly important. Because the absorption temperature of the hot potassium carbonate system approaches more closely the temperature of the low temperature shift reaction, smaller heat losses are encountered as the gas stream is alternately colled and heated between the two low temperature shift stages than if lower temperature absorbent systems are employed which generally operate about at least 100°F lower in temperature. Secondly, it has been found that the capital cost and thermal efficiency of the hot potassium carbonate absorption system reaches close to its optimum when operated to remove $CO_2$ down to the levels required for close to optimum operation of the second low temperature shift converter. At the same time, with the bulk of the $CO_2$ removal duty being performed by the thermally efficient hot potassium carbonate system, only small amounts of $CO_2$ remain to be absorbed in the final non-isothermal scrubbing stage. The ability of the non-isothermal scrubbing system to reduce the $CO_2$ to a final very low level more than compensates for its lower thermal efficiency because of the substantial reduction in hydrogen losses in the methanator and recycle purge resulting from the very low level of $CO_2$ in the gas entering the methanator.

Another highly important aspect of the invention is the manner in which the heat content in the process gas, both sensible and latent, is recovered and retransferred to the process gas stream as the process gas leaving the low temperature shift converter is first cooled prior to entering the first bulk $CO_2$ removal stage and then reheated following bulk $CO_2$ removal prior to entering the final low temperature shift converter. In accordance with the preferred embodiment of the invention, such heat transfer operation is carried out with a system that includes a series of direct contactors where both the latent and sensible heat of the shifted gas is transferred to a circulating stream of water which is then employed to reheat and resaturate the process gas leaving the first stage of $CO_2$ removal before it enters the final low temperature shift converter.

In accordance with a particularly preferred embodiment of the invention, the hot process stream leaving the first low temperature shift converter, is contacted, prior to $CO_2$ removal, with a circulating stream of water in a direct contactor, cooling the process gas and heating the water. The thus cooled, $CO_2$ containing gas is then scrubbed in the first $CO_2$ scrubbing stage to remove the bulk of $CO_2$ down to a residual level of, e.g. 0.5 to 1%. The thus treated process gas from the first $CO_2$ removal stage, now typically reduced in volume by e.g. 15%, to 30% compared to the volume of the gas prior to $CO_2$ removal, in then contacted in a direct contactor with the hot water heated by the higher volume process gas stream prior to $CO_2$ removal, Both the sensible heat of the $CO_2$ content of the effluent from the first low temperature shift converter, and the latent heat of the steam associated with such $CO_2$ content, is transferred with a high degree of efficiency to the lower volume process gas stream passing from the bulk $CO_2$ removal stage to the final low temperature shift conversion stage.

In accordance with preferred embodiments of the invention, the heat required to generate the stripping steam for the first and second $CO_2$ removal stages is supplied by the heat content of the hot process gas. It is possible to supply the full steam stripping requirements of both $CO_2$ removal systems entirely from the heat contained in the process gas by virtue of the manner in which the $CO_2$ removal systems are integrated with the shift conversion systems, enabling both systems to operate at a maximum thermal efficiency.

Reference is now made to the accompanying drawing wherein the FIGURE is a schematic flowsheet showing an ammonia synthesis train wherein the CO shift conversion systems and the $CO_2$ removal systems have been integrated in accordance with preferred embodiments of the invention.

In the embodiment shown in the FIGURE, the hydrocarbon feedstock is a gaseous or light liquid hydrocarbon which is introduced into the primary reformer 1 thru line 1a. Steam is introduced thru line 2 and the mixture flows into the reformer through line 3. In accordance with the usual practice for the steam reforming of gaseous or light liquid hydrocarbons up to about the naphtha range, the mixture of steam and hydrocarbon is passed through tubes 4 packed with a catalyst 5 which is normally a nickel catalyst supported on an alumina base. The tubes 4 are externally heated by burning a fuel-air mixture introduced by line 6 around the exterior of the tubes such that the steam-hydrocarbon mixture is subjected to temperatures of 1000° to about 1500°F as it passes over the nickel catalyst. In the reforming reaction most of the hydrocarbons are converted by reaction with steam to a mixture of hydrogen and carbon monoxide and minor amounts of carbon dioxide and unreacted hydrocarbons. Using methane as the hydrocarbon feedstock, for example, in normal practice about 70% of the methane will be reformed to a mixture of hydrogen and carbon monoxide and small amounts of carbon dioxide such that the gas leaving the reformer by line 7 will contain about 10% by volume of residual methane.

The hot mixture leaving the primary reformer is conducted by line 7 to secondary reformer 8, provided with a bed of a nickel reforming catalyst 8a. Upstream from the bed of catalyst 8a, air is introduced thru line 8b which burns a portion of the reformed gases raising the temperature of the process gas stream typically to a temperature of 2000°F. As the superheated mixture passes thru the catalyst bed 8a, unreformed hydrocarbons are largely converted into carbon monoxide and hydrogen and the hot process gas stream, now containing normally only a few tenths percent of unconverted hydrocarbons, is withdrawn from the secondary reformer by line 9. The amount of air introduced through line 9 is chosen to provide the correct proportion of nitrogen for the subsequent ammonia synthesis reactor.

The primary and secondary reformers are operated under substantial superatmospheric pressures generally ranging from 100 to 600 psig, such superatmospheric pressures being required not only for the economical operation of the reformer, but also for the economic operation of the shift conversion and $CO_2$ removal systems and to minimize the cost of compressing the synthesis gas to ammonia synthesis pressures.

The superatmospheric pressure gas mixture leaving the secondary reformer by line 9 consists primarily of a mixture of steam, hydrogen, carbon monoxide, nitrogen, $CO_2$, and very small amounts of unconverted hydrocarbons. Using methane as a hydrocarbon feedstock, a typical gas leaving the secondary reformer would contain 22% nitrogen, 55% hydrogen, 13% carbon monoxide, 8% carbon dioxide, 0.3% methane, and 0.3% argon (all on an anhydrous basis) together with about 60% $H_2O$ as steam based on the total dry gas components.

In order to effect the conversion of the carbon monoxide content of the gas leaving the secondary reformer to additional hydrogen, the gases pass through a series of shift converters operated and integrated with the $CO_2$ removal system in accordance with the invention. The shift conversion system in the embodiment shown in the FIGURE consists of high temperature shift conversion reactor 14, followed by primary low temperature shift conversion reactor 23, without intermediate $CO_2$ removal, to effect the conversion of all but a small residual amount of the carbon monoxide content of the gas. Following heat exchange and a first stage of $CO_2$ removal as will be described below, the gas is then subjected to a second and final stage of low temperature shift conversion in secondary low temperature shift conversion reactor 26 to reduce the $CO_2$ content to a very low level.

Attention is now directed to the first two stages of shift conversion carried out in the high temperature shift conversion reactor 14 and in the primary low temperature shift conversion reactor 23. The superatmospheric pressure process gas mixture leaving secondary reformer 8 by line 9 typically at a temperature of 1850°F is first passed thru heat exchanger 10 where it passes over a tube bundle 11 supplied with boiler feed water thru line 11a and delivering steam thru line 11b. In normal practice high pressure steam at, e.g. 1500 psig is raised in heat exchanger 10 which is used to operate steam turbines driving the synthesis gas compressors or other mechanical equipment required in the process.

The thus cooled process gas stream now typically at a temperature of, e.g. 700°F is then introduced by line 13 into the high temperature shift conversion reactor 14 and passed over high temperature shift conversion catalyst 15 at a temperature in the range of from 600°–1000° F and usually in the range of from 650°–900°F. The high temperature shift conversion catalyst is normally an iron oxide catalyst usually promoted with small amounts of another metal oxide, such as chromium oxide. Suitable high temperature shift conversion catalysts are described, for example, in U.S. Pat. Nos. 2,364,562; 2,602,020; 2,631,086; and 2,815,331.

In the high temperature shift conversion reactor 14, because of the relatively high temperature employed, the conversion of the carbon monoxide is incomplete for the reason explained, namely that the shift equilibrium constant, $K_p$, for the reversible shift reaction is less favorable at higher temperatures and the presence of the relatively large amount of shifted $CO_2$ further reduces the amount that can be shifted at a given temperature. Generally, it is possible to convert only about 80% of the carbon monoxide in the high temperature shift converter and typically the residual carbon monoxide content leaving the high temperature shift converter by line 16 is of the order of 2.5 to 3.5%.

The effluent from high temperature shift converter 14, leaving at a temperature typically of e.g. 850°F is conducted by line 16 to a heat exchanger 17, where it passes over a tube bundle 18, supplied with boiler feedwater thru line 19a and delivering steam thru line 19b. The cooled effluent, typically at a temperature of e.g. 630°F, is conducted by line 20 to a gas-to-gas heat exchanger 21, where it passes over a tube bundle 77 carrying process gas which has been treated in the second $CO_2$ removal unit and which requires preheating prior to methanation. The process gas from line 20 flowing over the tube bundle 77 in heat exchanger 21 preheats the process gas prior to methanation and is itself cooled, leaving heat exchanger 21 by line 22 typically at a temperature of 420°F.

The thus cooled process gas stream is then introduced into the primary low temperature shift converter 23, and passed over low temperature shift conversion catalyst 24. The low temperature shift conversion catalyst is normally a copper-zinc catalyst made by preparing a mixture of zinc and copper oxide and activated by a controlled reduction of the copper oxide to metallic copper. Suitable low temperature shift conversion catalysts are described, for example, in U.S. Pat. Nos. 3,303,001; 3,390,102; 3,546,140; and 3,615,217.

These catalysts operate in the temperature range of from 350° to 550°F and usually in the range of from 400° to 500°F.

In the low temperature shift conversion reactor 23, because of the lower temperatures employed, the conversion of the carbon monoxide is carried to a higher degree of completion since the shift equilibrium constant $K_p$ for the reversible shift reaction is more favorable at the lower temperatures. However, because of the presence of substantial quantities of $CO_2$ (usually in the range of from 15 to 25%, anhydrous basis), it is generally not possible to reduce the concentration of CO below about 0.2% in the presence of such substantial amounts of $CO_2$ and typically the residual carbon monoxide content leaving the primary low temperature shift converter 23 will range from 0.25 to 0.35%.

As previously pointed out, it is essential in the practice of the invention that the conversion of CO in the first series of shift conversion reactors be carried to a 90–99%, and preferably 95–98% level of completeness. Higher amounts of unconverted CO leaving the primary low temperature shift conversion not only adversely affect the performance of the secondary low temperature shift converter 26 in its ability to reduce the final CO to low values but also adversely affect the thermal efficiency of the overall $CO_2$ removal system. During the operation of the low temperature shift conversion catalyst 24 the catalyst gradually declines in activity. This decline, which is usually due to the loss of catalyst surface area with time and/or the poisoning effect of small traces of sulphur compounds in the process gas, is evidenced by a rise in the operating temperature required to maintain catalyst activity with an attendant rise in the CO concentration in the shifted gas. When the CO concentration rises to an unacceptable level, the catalyst is normally replaced with a new charge. The references herein to the percent conversion of the CO during the shift reaction or to the residual CO in the shifted gas are intended to refer to the CO values obtained during the middle portion of the catalyst run rather than the values obtained initially or at the end of the run when the catalyst must be replaced because of loss of activity.

The process gas stream leaves the primary low temperature shift converter 23 by line 25 typically at a temperature of 450°F and containing approximately 18% $CO_2$. It is then conducted to tube bundle 28a of gas-to-gas heat exchanger 28 where it preheats process gas entering heat exchanger 28 thru line 57 which has been previously subjected to the first stage of $CO_2$ removal. The process gas stream, typically at a temperature of 390°F, is then conducted by line 29 to direct contactor tower 30. In direct contactor tower 30, the process gas entering at the bottom thru line 29 is contacted with the circulating water introduced into the top of the tower by line 32 and liquid distributor 33. The tower 30 is equipped with tower packing or contact plates indicated by numeral 31 to insure intimate contact between the water flowing down over the packing or plates 31 and the process gas stream rising upwardly through the tower counter-currently to the descending liquid.

Hot water accumulating at the bottom of tower 30 in sump 34 is conducted by line 35 to a second direct contactor tower 36 similarly equipped with packing or contact plates 37. The hot water entering tower 36 by line 35 is distributed by liquid distributor 38 over the packing or contact plates 37, and flows downwardly thru the tower 36 counter-currently to process gas entering the bottom of the tower thru line 56.

Water, cooled by contact with the process gas, collects at the bottom of contact tower 36 in sump 39 and is returned to the top of contact tower 30 by line 40, circulating pump 41, and line 32. As will be explained in more detail hereinafter, through the agency of the pair of direct contact towers 30 and 36 and the water that is circulated around these towers, heat contained in the relatively hot process gas stream entering tower 30 thru line 29 is transferred to the relatively cool process gas stream entering tower 36 thru line 56.

The process gas stream after having given up a portion of its heat content in direct contact tower 30 leaves tower 30 by line 42 typically at a temperature of 290°F and is conducted to reboiler 43. In reboiler 43, the process gas passes thru tube bundle 44 where it heats scrubbing solution in the second, non-isothermal $CO_2$ removal unit as will be described subsequently. The process gas stream leaving tube bundle 44 typically at a temperature of 260°F is then conducted by line 45 to knock-out pot 46, where steam condensate collects in sump 47, a portion of the condensate being injected through line 48 into the process gas stream flowing in line 56 and another portion being removed from the system by line 49 for any desired use.

The process gas stream leaving the knock-out pot 46 by line 50 is introduced into the bottom of absorber tower 51, wherein the bulk of the $CO_2$ content of the gas is removed by contact with a hot aqueous solution of potassium carbonate as will be described below in more detail. The hot potassium carbonate scrubbing system comprises absorber tower 51, provided with tower packing or contact plates 53 to insure intimate contact between gas stream and the potassium carbonate scrubbing solution, and regeneration tower 52 supplied with tower packing or contact plates 54 to insure intimate contact between stripping steam and the potassium carbonate solution. Other details of the hot potassium carbonate scrubbing solution will be described subsequently.

After the removal of the bulk of the $CO_2$ from the gas stream in absorber tower 51, the process gas stream leaves the top of the absorber tower by line 55 typically at a temperature of 210°F and typically containing 0.5% $CO_2$. The process gas stream then flows by line 56 to direct contact tower 36 where it is brought into direct contact with water that has been heated to a temperature typically of 340°F by the hot process gas stream entering direct contact tower 30 by line 29. After passing through direct contact tower 36, the process gas is removed at the top of the tower by line 57 typically at a temperatue of 330°F and saturated with water. The process gas stream then passes through gas-to-gas heat exchanger 28 where it flows over tube bundle 28a and is heated by the process gas coming from primary low temperature shift converter 23 by line 25.

The process gas stream, now typically at a temperature of 400°F flows by line 58 into secondary low temperature shift converter 26 provided with low temperature shift conversion catalyst 27 where the small amount of CO remaining in the process gas after primary low temperature shift conversion is subjected to further shift conversion with the result that the treated gas leaving the secondary low temperature shift by line 59 contains only a very small residual amount of carbon monoxide typically in the range of from 0.01 to 0.03% (anhydrous basis) by volume.

The low temperature shift conversion catalyst 27, employed in the secondary low temperatue shift converter 26, will normally be a copper-zinc catalyst of the same general type employed in the primary low temperature shift converter 23, and will operate in generally the same temperature range, i.e. from 350° to 550°F and usually in the range of from 400° to 500°F. It will often be advantageous to operate the secondary low temperature shift converter at a somewhat lower temperature than the primary low temperature shift converter, e.g. from 50° to 75°F lower in temperature mainly because the reduced CO load to be shifted by the secondary low temperature shift converter leads to a lower temperature rise through the shift catalyst bed.

The ability of the secondary low temperature shift converter to reduce the carbon monoxide to very low residual levels results from a combination of the following factors. First, because of the low shift temperature employed, conversion of the carbon monoxide is favored because of the favorable shift equilibrium constant $K_p$ for the reversible shift reaction. Secondly, because all but a small percentage of the $CO_2$ has been removed in the first $CO_2$ removal stage, the secondary low temperature shift conversion takes place in the presence of only a small amount of $CO_2$, which favors the more complete conversion of the carbon monoxide to $CO_2$ and hydrogen. Thirdly, because the amount of CO entering the secondary low temperature shift converter is low, only small amounts of $CO_2$ are formed during the shift reaction, which again favors the more complete conversion of the CO. Fourthly, because of the small amount of CO entering the secondary low temperature shift converter, it is possible to achieve a high steam to CO ratio in the secondary low temperature shift conversion without incorporating large amounts of steam in the process gas which would lower the thermal efficiency of the system. A high steam to CO ratio, of course additionally favors the more complete conversion of the CO.

The process gas stream leaving the secondary low temperature shift conversion reactor 26 by line 59, typically at a temperature of 410°F, and containing e.g. 0.02% CO and 0.7% $CO_2$, is then conducted to reboiler 60. In reboiler 60 the process gas passes through tube bundle 61 where it heats the potassium carbonate scrubbing solution in the first essentially isothermal $CO_2$ removal unit as will be described subsequently. The process gas stream leaving tube bundle 61, typically at a temperature of 250°F, is then conducted by line 62 to heat exchanger 63 which, in the embodiment shown is a boiler feed water heater containing tube bundle 64a supplied with boiler feed water through line 64b, heated boiler feed water being delivered through line 64c. The process gas leaves boiler feed water 63 by line 65 typically at a temperature of 120°F and is conducted to knock-out pot 66 from which condensate is removed by line 67 for any desired use.

The process gas stream is then conducted by line 68 to absorber tower 69 of the second non-isothermal $CO_2$ removal stage comprising absorber tower 69 provided with tower packing or contact plates 71 to insure intimate contact between the gas and the scrubbing solution. Regeneration of the scrubbing solution occurs in stripping tower 70 provided with tower packing or contact plates 72. The details of the second non-isothermal $CO_2$ scrubbing system will be described subsequently.

In the second non-isothermal $CO_2$ removal unit, the relatively small amount of $Co_2$ in the gas entering absorber 69 is reduced to a low level, typically of the order of 10–50 ppm and the process gas stream thus reduced in $CO_2$ content leaves the top of absorber 69 by line 73 and is conducted to gas-to-gas heat exchanger 74 where it flows over tube bundle 75 where it is heated by relatively hot process gas flowing through tube bundle 75 coming from methanation reactor 79. The process gas now typically at a temperature of 230°F flows by line 76 to a second gas-to-gas heat exchanger 21 where it flows through tube bundle 77 and is heated by relatively hot process gas entering the shell of heat exchanger 21 from line 20. The process gas stream, now typically heated to a temperature of 600°F, flows by line 78 to methanation reactor 79 provided with a methanation catalyst 80. The methanation catalyst 80 is normally a nickel catalyst and operates at a temperature of generally in the range from 550° to 800°F. In the methanation reactor 79 small amounts of residual CO and $CO_2$ are converted to methane by reaction of the CO and $CO_2$ respectively with hydrogen present in the process gas stream such that the combined residual concentration of CO and $CO_2$ in the gas stream leaving the methanation reactor by line 81 is generally less than 10 ppm. The process gas stream is then conducted by line 81 to heat exchanger 82 where it flows over tube bundle 82a supplied with water through line 82b, hot water or steam leaving by line 82c.

The process gas stream now typically at a temperature of 300°F is conducted by line 83 to gas-to-gas heat exchanger 74 where it flows through tube bundle 75 and heats the process gas stream flowing through the heat exchanger from line 73 and itself is cooled. The process gas stream now typically at a temperature of 190°F leaves heat exchanger 74 by line 84 and is conducted to cooler 85 and then is conducted by line 86 to knock-out pot 87 typically at a temperature of 100°F. Condensate separated in knock-out pot 87 is removed by line 88 for any desired use and the cooled gas stream is then conducted by line 89 to synthesis gas compressor unit 90 where the gas is compressed to ammonia synthesis pressures typically of the order of from 2000 to 8000 psig.

After compression and introduction of the recyle gas from line 96 the combined process gas stream is then conducted by line 91 to ammonia synthesis converter 92 provided with ammonia synthesis catalyst 93. The ammonia synthesis catalyst is normally a promoted iron catalyst and operates usually at temperatures in the range of from 650° to 900°F. In the ammonia synthesis converter, partial conversion of the nitrogen and hydrogen in the gas stream to ammonia occurs, the usual percentage conversion per pass over the ammonia synthesis catalyst being of the order of 15 to 30%.

The process gas stream leaving the ammonia synthesis reactor by line 94 typically contains 10% ammonia, 18% nitrogen, 54% hydrogen and the balance is inerts consisting almost entirely of methane and argon.

The process gas stream then enters ammonia recovery unit 95 where most of the ammonia is recovered by chilling the process gas, ammonia product being withdrawn by line 97 and unconverted hydrogen and nitrogen being recycled to the synthesis gas compression unit 90 by line 96 for compression and retreatment over ammonia synthesis catalyst 93.

The system comprising ammonia synthesis compression unit 90, ammonia synthesis reactor 92, ammonia recovery unit 95, and recycle line 96 is generally referred to as the ammonia recycle loop. In order to prevent the accumulation of inert materials consisting of methane and argon in this ammonia loop, it is necessary to continuously withdraw a purge stream 98, from the ammonia loop in order to maintain the concentration of these inert materials at a tolerable level. Usually the concentration of inerts in the ammonia loop is maintained at a level of from 15 to 30%. The composition of this purge gas is generally equivalent to the composition of the recycled gas stream 96, and consists mostly of nitrogen, hydrogen, a small amount of ammonia and small amounts of methane and argon. Typically it will contain 60% hydrogen and 3% ammonia. It has little value except as a waste fuel and represents one of the major losses of hydrogen and ammonia product in the entire system. As will be illustrated in the example which follows, the higher the concentration of methane entering the ammonia loop in the synthesis gas, the higher must be the rate of purge from the ammonia synthesis loop in order to maintain the concentration of inert materials in the loop at a tolerable level and, consequently, the greater the loss of the valuable hydrogen and ammonia product in the purge gas. By operating in accordance with the invention, the amount of methane entering the ammonia loop is greatly reduced, thus greatly reducing the purge losses of hydrogen and ammonia product.

Attention is now directed to the first substantially isothermal $CO_2$ scrubbing system including absorber tower 51 and regeneration tower 52. As previously described the process gas enters the bottom of tower 51 thru line 50 and after contact with hot aqueous potassium carbonate scrubbing solution is recovered from the top of scrubbing tower 51 by line 55. As the process gas travels upwardly through the tower through section 53 provided with tower packing or contact plates to insure intimate contact between the gas and scrubbing solution, it is brought into contact with a descending stream of aqueous potassium carbonate scrubbing solution introduced into the top of tower 51 through line 99 and liquid distributor 100. the scrubbing solution containing absorbed $CO_2$ collects at the bottom of tower 51 in sump 101 and is conducted by line 102, pressure letdown valve 103 and line 104 to the top of the stripping tower 52 where it is distributed over the tower packing or contact plates 54 by liquid distributor 105. As the solution passes through pressure letdown valve 103, the pressure is reduced from the superatmospheric pressure prevailing in column 51 to the pressure prevailing in stripping tower 52, viz., atmospheric pressure or a pressure slightly above atmospheric. As a result of the pressure reduction, a portion of the $CO_2$ is released from the solution at the top of the stripping tower 52 and the partially regenerated solution then flows downwardly through section 54 counter-currently to upwardly rising stripping steam generated at the bottom of the tower.

Stripping steam is provided at the bottom of tower 52 partly by means of solution reboiler 60 which is heated by hot process gas flowing through the tube bundle 61. Solution collecting at the bottom of stripping tower 52 in sump 106 is conducted by line 107 to the shell of reboiler 60 and then is returned together with steam generated in reboiler 60 to the bottom of tower 52 by line 108. Additional stripping steam is also provided to the bottom of tower 52 by line 109. As will be described more in detail subsequently, the stripping steam delivered by line 109 is derived from the second non-isothermal $CO_2$ scrubbing system.

As the scrubbing solution flows downwardly through section 54 of tower 52, it is contacted with upwardly rising stripping steam resulting in the desorption of the $CO_2$. The regenerated scrubbing solution collecting at the bottom of tower 52 in sump 106 is withdrawn by line 110 and is then returned by solution circulation pump 111 and line 99 to the top of the absorption tower 51.

The mixture of steam and $CO_2$ collecting at the top of stripping tower 52 is removed from the top of the tower by line 112, passes through condenser 113 and then is conducted by line 114 to knock-out pot 115. Condensate collecting in knock-out pot 115 is returned by line 116 to the top of stripping tower 52 in order to maintain the water balance of the system. $CO_2$ is removed from knock-out pot 115 by line 117 for any desired use.

The aqueous potassium carbonate solution employed in the first substantially isothermal $CO_2$ removal system is a relatively concentrated aqueous potassium carbonate solution having potassium carbonate concentrations by weight of from 15 to 45% and preferably from about 22 to 35% (these concentrations by weight being calculated on the assumption that all the potassium present is present as potassium carbonate). Such potassium carbonate solutions are preferably activated by the addition of additives such as ethanolamines; alkali metal borates, such as potassium or sodium borate; amino acids such as glycine; $As_2O_3$, or other additives which tend to increase the rates of absorption and desorption of $CO_2$ in the potassium carbonate solution.

Particularly preferred among these activators are the alkanolamines which are preferably added to the potassium carbonate solution in amounts ranging from about 1 to 10% by weight, and preferably from about 2 to 6% by weight. Diethanolamine is preferred from the standpoints of cost, relatively low volatility, and effectiveness. However, monoethanolamine, or triethanolamine, may also be employed in place of diethanolamine or mixtures of any two or three of these ethanolamines, may be employed.

As is well known, the absorption of $CO_2$ in the potassium carbonate solution produces potassium bicarbonate while regeneration or desorption releases $CO_2$, producing potassium carbonate. The reversible absorption and desorption reactions do not go to completion in either the absorption or regeneration stages, and consequently, the scrubbing solution is as circulated actually a mixture. The regenerated scrubbing solution fed to the absorber is a carbonate-bicarbonate mixture rich in carbonate while the solution leaving the absorber is a mixture rich in bicarbonate. References herein to scrubbing solution of potassium carbonate are of course intended to include mixtures of potassium carbonate with potassium bicarbonate formed during the absorption process.

As pointed out previously, the first $CO_2$ removal system is substantially isothermal in that the absorption and regeneration stages are both carried out substantially at temperatures in the vicinity of the atmospheric boiling temperature of the solution. As is apparent from the embodiment shown in the FIGURE, there is no heating or cooling of the solution as it is continuously circulated between the absorption and regeneration towers. In some cases, it may be desirable to cool a minor portion of the regenerated scrubbing solution before recycle to the absorption tower and to deliver this minor portion to the top of the absorption tower while the bulk of the uncooled solution is delivered to the absorption tower at an intermediate point. In some cases, such minor cooling of the stream delivered to the top of the absorption tower may be employed to achieve a further reduction in the residual concentration of $CO_2$ in the scrubbed gas leaving the absorption tower without substantially affecting the thermal efficiency of the system. In any event, at least the major portion of the absorption in tower 51 should occur at a temperature in the vicinity of the atmospheric boiling temperature of the solution, and the mean absorption temperature prevailing in the absorption tower will generally range from 210° to 270°F and preferably from 220° to 250°F.

While the absorption in tower 51 takes place at the superatmospheric pressures prevailing in the gas synthesis train, the regeneration of the solution in stripping tower 52 is carried out at pressures at or close to atmospheric pressure. The stripping tower 52 would generally be operated at pressures ranging from atmospheric to about 35 pounds per square inch gage, whereas the pressures prevailing in absorption tower 51 will generally be in excess of 150 pounds per square inch gage and usually in the range of from 250 to 1500 per square inch gage.

In accordance with the invention the $CO_2$ content of the process gas is reduced to a residual level of not less than 0.1% by volume and not more than 2% by volume in the first substantially isothermal $CO_2$ removal unit employing hot potassium carbonate as the absorbent. It has been found that if the $CO_2$ removal in the hot potassium carbonate unit is carried below a residual $CO_2$ level of less than 0.1%, the overall thermal efficiency of $CO_2$ removal in the system as a whole (i.e., the sytem including both the hot potassium carbonate unit and the subsequent non-isothermal $CO_2$ scrubbing unit) declines substantially because of the increased requirements for regeneration steam in the hot potassium carbonate unit, and at the same time the cost of the hot potassium carbonate scrubbing unit increases substantially. On the other hand, it has been found that if the $CO_2$ content of the process gas is not reduced in the hot potassium carbonate unit to at least a level of 2% by volume, the overall thermal efficiency of the system as a whole declines substantially because of the increased $CO_2$ removal duty imposed on the subsequent non-isothermal scrubbing unit with little or no offsetting increase in the thermal efficiency of the hot potassium carbonate scrubbing unit. At the same time, if the $CO_2$ content of the process gas leaving the hot potassium carbonate unit becomes more than 2%, the operation of the secondary low temperature shift converter is adversely affected in that it becomes difficult to achieve the desired conversion of the $CO_2$ content of the process gas to low levels. Preferably, the $CO_2$ content of the process gas is reduced in the hot potassium carbonate unit to a residual level of not less than 0.2% and not more than 1% by volume.

Attention is now directed to the second non-isothermal $CO_2$ scrubbing system including absorber tower 69 and regeneration tower 70. As previously described, the process gas enters the bottom of tower 69 through line 68, and after contact with the relatively cool scrubbing solution, it is recovered from the top of the absorption tower 69 by line 73. As the solution travels upwardly through the tower through section 71 provided with tower packing or contact plates to insure intimate contact between the gas and the scrubbing solution, it is brought into contact with a descending stream of a relatively cool scrubbing solution introduced into the top of the tower 69 through line 117 and liquid distributor 118. The scrubbing solution containing absorbed $CO_2$ collects at the bottom of tower 69 in sump 119. It is then conducted by line 120 to tube bundle 121 of solution-to-solution heat exchanger 122 where it is heated by indirect heat exchange with hot regenerated solution. The heated solution is then conducted by line 123, pressure letdown valve 124 and line 125 to the top of stripping tower 70 where it is distributed over the tower packing or contact plates 72 by liquid distributor 126. As the solution passes through pressure letdown valve 124, the pressure is reduced from the superatmospheric pressure prevailing in column 69 to the pressure prevailing in stripping tower 70, viz., atmospheric pressure or pressure slightly above atmospheric. The solution in the stripping tower flows downwardly through section 72 counter-currently to upwardly rising stripping steam generated in the bottom of the tower.

Stripping steam is provided at the bottom of tower 70 by means of solution reboiler 43 which is heated by hot process gas flowing through tube bundle 44. Solution collecting at the bottom of stripping tower 70 in sump 127 is conducted by line 128 to the shell of reboiler 43 and then is returned together with steam generated in reboiler 43 to the bottom of tower 70 by line 129.

As the scrubbing solution flows downwardly through section 72 of tower 70, it is contacted with upwardly rising stripping steam resulting in the desorption of $CO_2$. The regenerated scrubbing solution collecting at the bottom of tower 70 in sump 127 is withdrawn by line 130 and then conducted by solution recycle pump 131, line 132, solution-to-solution heat exchanger 122, line 132, cooler 133 and line 117 to the top of absorption tower 69. As the solution travels from the bottom of regeneration tower 70 to the top of absorber tower 69, it is first cooled in heat exchanger 122 by indirect heat exchange with relatively cool scrubbing solution passing through tube bundle 121 and then is further cooled typically to a temperature of 110°F in cooler 133 before being introduced into the top of tower 69.

In the preferred embodiment shown in FIG. 1, the mixture of steam and desorbed gas collecting at the top of stripping tower 70 is conducted by line 109 and line 108 to the bottom of stripping tower 52. To facilitate the transfer of steam from tower 70 to tower 52, the pressure in tower 70 is maintained slightly higher (e.g. 0.2 to 3.0 psig higher) than the pressure in tower 52. The stripping steam is then reused in tower 52 for stripping the aqueous potassium carbonate absorbent in column 52. Although the stripping steam leaving tower 70 contains some $CO_2$, the concentration of $CO_2$ is relatively small because of the relatively small amounts of $CO_2$ removed in the second non-isothermal scrubbing system. Typically the gas entering the scrubbing tower 69 by line 68 may contain approximately 1% $CO_2$. The concentration of $CO_2$ in the stripping steam leaving the top of tower 70 is also kept low by employing a high stripping steam rate in tower 70. While ordinarily it would be thermally inefficient to employ a high stripping steam rate in tower 70, the overall thermal efficiency of the system is not affected if the stripping steam from tower 70 is reused in stripping tower 52.

The high rate of stripping steam employed in tower 70 furthermore makes possible the very thorough regeneration of the scrubbing solution so that the residual $CO_2$ can be reduced to minimal levels in absorber tower 69.

The scrubbing solution employed in the second non-isothermal $CO_2$ removal system is an aqueous solution of an alkaline chemical absorbent capable of reacting with $CO_2$ to form a $CO_2$ reaction product which is capable of regeneration by steam stripping causing the $CO_2$ to be desorbed. Typical scrubbing solutions suitable for the second non-isothermal $CO_2$ removal stage are alkanolamines, particularly the ethanolamines, such as monoethanolamine, diethanolamine and triethanolamine. Such ethanolamines are normally employed in aqueous solutions containing from 15 to 35% by weight of the ethanolamine. Other suitable amine-type chemical absorbents are aqueous solutions of glycol amines such as diglycol amine, alkyl and cycloalkyl amines, polyamines, bicycloamines and aromatic heterocyclic amines. Inorganic chemical absorbents may also be employed in the second non-isothermal scrubbing stage such as aqueous solutions of potassium carbonate or aqueous solutions containing mixtures of potassium carbonate and ethanolamines.

Mean absorption temperatures in the second non-isothermal scrubbing stage will be substantially below the atmospheric boiling temperature of the solution and will normally range from 90° to 140°F and preferably from 100° to 130°F, while regeneration of the solution is carried out at the solution boiling temperatures, namely temperatures in the range of from 220° to 260°F. In contrast to the first $CO_2$ scrubbing stage which is essentially isothermal in character, the absorption and regeneration in the second $CO_2$ scrubbing stage occur at substantially different temperatures such that a solution-to-solution heat exchanger is required between the absorption and regeneration stages to heat the scrubbing solution as it travels from the absorption tower to the stripping tower and conversely to cool the regenerated solution as it travels from the stripping tower to the absorption tower. Because of the non-isothermal character of the second $CO_2$ scrubbing stage, its thermal efficiency is much lower than that of the first isothermal $CO_2$ scrubbing stage. However, because only a small fraction of the $CO_2$ will normally be removed in the second non-isothermal stage, the overall thermal efficiency of the $CO_2$ scrubbing system as a whole is not greatly affected. In accordance with the invention, in a great majority of cases, not more than 15% and preferably not more than 5% of the total $CO_2$ scrubbed will be removed by the second non-isothermal scrubbing stage.

In the second non-isothermal scrubbing stage, the concentration of $CO_2$ in the process gas is reduced to a level of not more than 200 ppm and preferably not more than 100 ppm. Because of the chemical nature of the absorbent and the relatively low absorption temperatures, the $CO_2$ may be reduced to these low levels quite readily in the second non-isothermal scrubbing stage. As a result of such low $CO_2$ levels, the losses of hydrogen in the subsequent methanation step and the losses of hydrogen and ammonia in the purge gas and the subsequent ammonia loop are greatly reduced.

EXAMPLE

The following example illustrates a specific application of the invention using a natural gas as the feedstock for the ammonia synthesis train and employing the process sequence illustrated in the drawing. Natural gas, consisting essentially of methane, and superheated steam are mixed and preheated to 950°F and introduced into a primary reformer containing a nickel catalyst supported on an alumina base. The steam to carbon molar ratio in the feedstream to the primary reformer is 4.0. The primary reformer is operated at a temperature of 1500°F and at a pressure of 450 psig. The reformed gas from the primary reformer is then introduced into the secondary reformer where it is mixed with air in amount to provide the correct ultimate nitrogen to hydrogen ratio in the ammonia synthesis gas. The gas leaves the secondary reformer at a temperature of 1830°F and under a pressure of 410 psig. The hot mixture is then passed through a heat exchanger where the gas is cooled to a temperature of 700°F and the heat recovered generates high pressure steam which is employed to drive steam turbines operating the synthesis gas compressor.

The process gas stream now at a temperature of 700°F and a pressure of 400 psig, and having the composition shown in column 1 of Table I, is conducted to the high temperature shift converter where it is passed into contact with an iron oxide high temperature shift conversion catalyst entering the catalyst at 700°F and leaving the catalyst at 810°F. The shifted gas, leaving the high temperature shift converter, has a composition as shown in Column 2 of Table I.

Table I

| Component | | Column 1 Gas Composition After Secondary Reformer Vol % | Column 2 Gas Composition After High Temperature Shift Conversion Vol % | Column 3 Gas Composition After Primary Low Temperature Shift Conversion Vol % |
|---|---|---|---|---|
| $N_2$ | (Dry basis)* | 22.80 | 20.80 | 20.30 |
| $H_2$ | " | 55.60 | 59.50 | 60.50 |
| $CH_4$ | " | 0.27 | 0.24 | 0.24 |
| A | " | 0.28 | 0.26 | 0.25 |
| $CO_2$ | " | 8.05 | 16.10 | 18.23 |
| CO | " | 13.00 | 3.10 | 0.48 |
| Total | " | 100.00 | 100.00 | 100.00 |
| Water content Vol % as a percent of Total Dry Gas | | 60.3 | 42.2 | 42.2 |

*Dry basis = based on total gas excluding water

The process gas stream is then cooled from 810° to 440°F while the heat removed from the gas stream is used for the generation of steam.

The process gas stream now at a temperature of 410°F and at a pressure of 398 psig is introduced into the primary low shift converter and contacted with a zinc-copper low temperature shift conversion catalyst whereupon most of the remaining CO in the process gas is converted to hydrogen and $CO_2$. The process gas leaving the primary low temperature shift converter has a composition as shown in Column 3 of Table I and is at a temperature of 440°F and at a pressure of 395 psig.

It will be noted that the carbon monoxide content of the gas from the secondary reformer (viz. 13.0%) is converted successively in the high temperature shift converter to a residual content of 3.1% and in the primary low temperature shift converter to a concentration of 0.48%. Thus, in the first two stages of shift conversion 96.3% of the CO is converted to hydrogen and $CO_2$. It is to be noted that the concentration of $CO_2$ in the exit from the primary low temperature shift converter is 18.2%. At this relatively high concentration of $CO_2$, the shift conversion of the CO to very low residual levels in the primary low temperature shift converter is not feasible.

The process gas from the primary low temperature shift converter is conducted to a gas-to-gas heat exchanger (heat exchanger 28 in the FIGURE) where it is brought into indirect heat exchange with process gas entering heat exchanger 28 by line 57 at a temperature of 330°F. The process gas stream leaves the heat exchanger by line 29 at a temperature of 388°F and is conducted to direct contactor 30 supplied with water by line 32 at a temperature of 274°F. While passing through the contactor 30, the process gas is cooled to 291°F and the water is heated to 337°F and is conducted by line 35 to direct contactor 36.

The process gas is next conducted to the reboiler 43 of the non-isothermal $CO_2$ scrubbing unit, entering reboiler 43 at temperature of 291°F and leaving at a temperature of 260°F. At a temperature of 260°F and at a pressure of 390 psig, the process gas enters scrubbing tower 51 of the hot potassium carbonate scrubbing system where it is contacted with an aqueous potassium carbonate solution containing 30% by weight of potassium carbonate and 3% by weight of diethanolamine. In the hot potassium carbonate scrubbing tower 51 the bulk of the $CO_2$ content of the gas is removed and the gas leaves the top of absorption tower 51 at a temperature of 210°F and has the composition shown in Column 1 of Table II. As shown in Table II, the $CO_2$ content of the gas leaving the potassium carbonate scrubber is 0.5% by volume (dry basis).

Following the hot potassium carbonate scrubbing unit, the gas is next conducted at a temperature of 210°F and at a pressure of 388 psig to direct contactor 36. In order to supply the water required for the secondary low temperature shift conversion, a portion of the condensate from knock-out pot 46 may be injected by line 48 into the process gas prior to introduction into direct contactor 36. The gas entering direct contactor 36 by line 56 at a temperature of 210°F contacts relatively hot water introduced into the top of contact tower 36 through line 35 at a temperature of 337°F.

In the contact tower 36, the process gas stream is heated to a temperature of 330°F and is saturated with water as a result of the counter current contact between the gas stream and the hot water descending through the tower. The heating of the gas stream and its saturation with water in contact tower 36 is substantially facilitated by the fact that the volume of process gas entering tower 36 by line 56 is substantially reduced in volume with respect to the process gas entering contact tower 30 by line 29 as a result of the fact that all but a small amount of the $CO_2$ (0.5%) has been removed from the process gas in the hot potassium carbonate scrubbing system. The process gas entering tower 36 by line 56 is only 82% of the volume of the process gas entering contact tower 30 by line 29. This permits the higher heat content of the higher volume gas stream entering contact tower 30 to be transferred to the stream of water that is circulated between towers 30 and 36 which in turn is transferred to the lower volume gas stream entering tower 36 by line 56. This in turn facilitates the reheating and resaturation of the process gas following the first $CO_2$ removal step to the temperature required in the secondary low temperature shift conversion.

The gas stream now at a temperature of 330°F and saturated with water leaves the top of contactor 36 by line 57 and then is brought into indirect heat exchange in gas-to-gas heat exchanger 28 with hot process gas from primary low temperature shift converter 23 and is heated to a temperature of 400°F and then is introduced into secondary low temperature shift converter 26 where it is brought into contact with a zinc-copper low temperature shift conversion catalyst where all but a very small residual portion of the CO is converted to hydrogen and $CO_2$. The process gas stream leaves secondary low temperature shift converter 26 by line 59 at a temperature of 409°F and has the composition shown in Column 2 of Table II. It is to be noted that the CO is

TABLE II

| Component | | Column 1 Gas Composition After Hot Potassium Carbonate $CO_2$ Removal System Vol % | Column 2 Gas Composition After Secondary Low Temperature Shift Conversion Vol % | Column 3 Gas Composition After Non-Isothermal $CO_2$ Removal System Vol % |
|---|---|---|---|---|
| $N_2$ | (Dry Basis)* | 24.70 | 24.50 | 24.82 |
| $H_2$ | " | 73.60 | 73.60 | 74.54 |
| $CH_4$ | " | 0.29 | 0.29 | 0.30 |
| A | " | 0.31 | 0.31 | 0.31 |
| $CO_2$ | " | 0.50 | 1.28 | .30 ppm |
| CO | " | 0.60 | 0.02 | 0.02 |
| Total | " | 100.00 | 100.00 | 100.00 |
| Water Content Vol % as a percent of Total Dry Gas | | 2.8 | 33.4 | .4 |

*Dry basis = based on total gas excluding water now reduced to a residual concentration of 0.02% (200 ppm) while the $CO_2$ content is 1.28%. A portion of this $CO_2$ was brought into the gas by stripping of $CO_2$ from the water used in tower which is saturated with $CO_2$ at a higher partial pressure in tower 30 than in tower 36.

The process gas stream leaving the low temperature shift converter 26 is conducted by line 59 to the reboiler 60 serving the hot potassium carbonate scrubbing unit at a temperature of 409°F, leaving the reboiler 60 by line 62 at a temperature of 245°F. It is then further cooled in boiler feed-water heater 64 to a temperature of 120°F and after passing through knock-out pot 66 is introduced into the bottom of absorber 69 of the second non-isothermal $CO_2$ removal system by line 68 where it is brought into contact with an aqueous solution of diethanolamine containing 22% by weight of diethanolamine. Regenerated diethanolamine enters the top of absorber tower 69 by line 117 at a temperature of 110°F and the $CO_2$ containing solution is withdrawn from the bottom of tower 69 by line 120 at a temperature of 125°F, passes through solution-to-solution heat exchanger 122 leaving at a temperature of 210°F, and is then conducted by line 123, pressure letdown valve 124 and line 125 to the top of steam stripping tower 70 operated at a pressure of 10 psig where it is stripped with steam generated at the bottom of the tower. Regenerated solution leaves at the bottom of stripping tower 70 by line 130 at a temperature of 245°F and is then recirculated by pump 131, line 132, and solution-to-solution heat exchanger 122 where it is cooled to temperature of 160°F, and then passes by line 132 to cooler 133 where it is further cooled to a temperature of 110°F before introduction into the top of absorber tower.

In the absorber tower 69 the $CO_2$ content of the gas is reduced from 1.28% to a residual concentration of 30 parts per million (ppm) by contact with the diethanolamine solution, and the process gas leaving the top of absorber tower by line 73 has the composition shown in Column 3 of Table II.

The process gas stream is next conducted by line 73 to gas-to-gas heat exchanger 74 where it is heated by the hot process gas from methanation unit 79 to a temperature of 228°F and then is conducted by line 76 to gas-to-gas heat exchanger 21 where it is further heated by contact with hot process gas from high temperature shift converter 14 to a temperature of 600°F. It is then introduced into methanation unit 79 where the small residual amounts of CO and $CO_2$ are converted to methane and water over a nickel methanation catalyst. The gas stream, now at a temperature of 604°F and having the composition shown in Column 1 of Table III is conducted by line 81 to waste heat boiler 82 where it is cooled to a temperature of 300°F and then to gas-to-gas heat exchanger 74 where it is further cooled by indirect heat exchange with the process gas coming from scrubbing tower 69 to a temperature of 192°F. The gas stream then flows to cooler 85 where it is further cooled to 100°F. It is then compressed to a pressure of 2200 psig and, after combining with recycle gas from line 96, is passed over a promoted iron ammonia synthesis catalyst operating at an inlet temperature of 800°F and an outlet temperature of 960°F.

Table III

| Component | | Column 1 Gas Composition after Methanation Vol % | Column 2 Composition of Recycle and Purge Gas Vol % |
|---|---|---|---|
| $N_2$ | (Dry Basis) | 24.85 | 20.22 |
| $H_2$ | " | 74.52 | 60.63 |
| $CH_4$ | " | 0.32 | 8.15 |
| A | " | 0.31 | 7.74 |
| $NH_3$ | " | — | 3.06 |
| Total | " | 100.00 | 100.00 |

The process gas leaving the ammonia synthesis reactor containing 15.17% $NH_3$, 17.73 $N_2$, 53.16% $H_2$, 6.79% Argon and 7.15% $CH_4$ is conducted to the ammonia recovery unit where the bulk of the ammonia product is removed leaving a recycle gas having the composition shown in Column 2 of Table III. In order to maintain the combined concentration of methane plus Argon at a level of 16.1% in the ammonia loop, a continuous purge gas stream is taken from the recycle loop by line 98, such purge gas having the same composition as the recycle gas, viz, that shown in Column 2 of Table III.

In order to illustrate the substantial reduction in process gas losses without loss of overall thermal efficiency made possible through the process of the invention, the results obtained in the foregoing example are compared to the results obtained using identical quantities of process gas and process steam but employing an ammonia synthesis train operating according to current normal practice. Such ammonia train differs from that employed in the invention in that intershift $CO_2$ scrubbing is not employed; the process gas is subjected to a high temperature and low temperature shift conversion followed by $CO_2$ scrubbing using an essentially isothermal hot potassium carbonate scrubbing system after which the process gas is subjected to methanation and sent to the ammonia synthesis loop. In Table IV the process gas composition just prior to methanation and following methanation, as well as the composition of the purge gas, is given for the ammonia train operated in accordance with the foregoing example and for an ammonia train operated according to such current normal practice.

Table IV

| Component | | Gas Composition Prior to Methanation, Vol % | | Gas Composition After Methanation Vol % | | Composition of Purge Gas Vol % | |
|---|---|---|---|---|---|---|---|
| | | According to Invention | Current Practice | According to Invention | Current Practice | According to Invention | Current Practice |
| $N_2$ | (Dry Basis) | 24.82 | 24.10 | 24.85 | 24.65 | 20.22 | 20.09 |
| $H_2$ | " | 74.54 | 74.53 | 74.52 | 73.95 | 60.63 | 60.66 |
| $CH_4$ | " | 0.30 | .36 | 0.32 | 1.09 | 8.15 | 12.53 |
| A | " | 0.31 | .31 | 0.31 | .31 | 7.94 | 3.57 |
| $CO_2$ | " | 0.003 (30 ppm) | 0.1 (1000 ppm) | Nil | Nil | Nil | Nil |
| CO | " | 0.002 (200 ppm) | 0.60 (6000 ppm) | Nil | Nil | Nil | Nil |

Table IV-continued

| Component | Gas Composition Prior to Methanation, Vol % | | Gas Composition After Methanation Vol % | | Composition of Purge Gas Vol % | |
|---|---|---|---|---|---|---|
| | According to Invention | Current Practice | According to Invention | Current Practice | According to Invention | Current Practice |
| $NH_3$ | — | — | — | — | 3.06 | 3.15 |

As will be noted from Table IV the combined level of CO and $CO_2$ in the gas just prior to methanation is only 0.023% (230 ppm) in the example in accordance with the invention while it is 0.41% (4100 ppm) in accordance with current practice. After methanation the level of methane in the gas is only 0.32% in the example according to the invention while it is 1.09% in accordance with current practice. The lesser amount of methane in the process gas reflects, of course, the lower hydrogen losses during the methanation step which characterizes operation in accordance with the invention. Even more importantly the lower methane content of the process gas flowing to the ammonia synthesis loop means that there will be a much slower build-up of inerts in the ammonia synthesis loop and the amount of purging required to hold the level of inerts at a tolerable level will be substantially reduced. In Table IV, the total concentration of inerts (i.e. methane plus argon) in the purge gas in the example according to the invention and in the example according to current practice is the same, viz. 16.1% but in the example according to the invention methane makes up only about half of this total, while in current practice the methane makes up 77% of the total.

The overall savings in process gas losses and the resulting increased ammonia production from the same quantity of process feed gas can be seen from Table V where the results from operating in accordance with the foregoing example are compared to operation in accordance with current practice.

TABLE V

| | According to Invention | Current Practice |
|---|---|---|
| Process Gas Feed, Methane, pound mols per hour | 2562 | 2562 |
| Process Steam, total, pounds per hour | 184,650 | 184,650 |
| Synthesis Gas Feed to Ammonia Loop, pound mols per hour | 11,035 | 10,752 |
| Total Hydrogen Feed to Ammonia Loop, pound mols per hour | 8,224 | 7,952 |
| Percent Inerts in Feed Gas to Ammonia Loop | 0.64% | 1.4% |
| Purge Gas Rate, pound mols per hour | 437 | 936 |
| Hydrogen Lost in Purge Gas, Tons per Day | 35.8 | 77.4 |
| Ammonia Lost in Purge Gas, Tons per Day | 2.7 | 6.0 |
| Net Ammonia Production, Tons per Day | 1082 | 1000 |

Note that in these comparative examples, the amount of process gas feed and the amount of process steam is identical in both cases. Due to the lower losses of hydrogen in the methanation step, the amount of synthesis gas feed to the ammonia loop and the amount of hydrogen to the ammonia loop is substantially increased in the operation according to the invention. Of greater importance, the percent of inerts (methane plus argon) in the feed gas to the ammonia loop is reduced to half the value of the present inerts obtained by operation in accordance with current practice, viz. from 1.4% inerts to 0.64% inerts. The purge gas rate is correspondingly reduced to less than half, viz. from 936 pound mols per hour to 437 pound mols per hour, while both the hydrogen losses and ammonia losses are similarly correspondingly reduced. Because of these reductions in the process gas losses, the net production of ammonia is increased by 82 tons per day, a production increase of 8.2% over current practice without any sacrifice of thermal efficiency. An increase of 82 tons per day amounts to an increase of 25,000 tons per year having a value of several million dollars per year.

In Table VI the source of the savings in process gas losses when operating in accordance with the foregoing example is shown expressed in terms of additional tons of ammonia production achieved.

Table VI

| Source of Increase | Increase in Ammonia Production Tons Per Day |
|---|---|
| Increase resulting from increased hydrogen production in secondary low temperature shift | 8.8 |
| Reduction in hydrogen loss resulting from methanation of carbon dioxide | 5.9 |
| Reduction in hydrogen loss resulting from methanation of carbon monoxide | 26.3 |
| Reduction in purge gas quantity by reduction of methane content of synthesis gas | 37.7 |
| Reduction in ammonia losses in purge gas | 3.3 |
| Total increase in ammonia production | 82.0 |

While the invention has been illustrated and exemplified in terms of ammonia synthesis trains employing reforming processes to produce the hydrogen-carbon monoxide mixtures which are then subjected to shift conversion, it is to be understood that the invention is also applicable to ammonia synthesis trains where the hydrogen-carbon monoxide mixtures are produced by the partial oxidation of hydrocarbons. Suitable hydrocarbon starting materials for conversion to hydrogen-carbon monoxide mixtures by partial oxidation include gaseous hydrocarbons such as methane, ethane, propane, butane or mixtures of these; liquid hydrocarbons such as crude petroleum or petroleum fractions such as those in the naphtha range, the kerosene range, or the heavier fractions, including the heavy residuals such as Bunker C; and solid hydrocarbons such as coal, lignite or the like. Parital oxidation processes to convert such hydrocarbon starting materials to mixtures of hydrogen and carbon monoxide under super-atmospheric pressure are, of course, well known. They generally involve reacting the hydrocarbon at elevated pressures with oxygen and steam. Since many of such hydrocarbons contain sulphur means for removal of the sulphur content of the process gas prior to contact with the sulphur-sensitive low temperature shift conversion catalysts should be provided.

It is to be understood of course that the invention is not limited to the illustrative embodiments described herein and that other embodiments not illustrated or specifically listed are included within the scope of the appended claims.

I claim:

1. In a process for the synthesis of ammonia from a hydrocarbon starting material involving the steps of generating under superatmospheric pressure a mixture comprising carbon monoxide and hydrogen from said hydrocarbon, converting the carbon monoxide in said mixture to hydrogen and $CO_2$ by reaction with water through catalytic shift conversion, removing said $CO_2$ from said mixture by absorption in a liquid scrubbing medium which is regenerated by steam stripping, converting residual CO and $CO_2$ to methane by reaction with hydrogen over a methanation catalyst, compressing said hydrogen together with nitrogen in about the molar ratio required for ammonia synthesis, passing said compressed mixture over an ammonia synthesis catalyst, recycling unconverted synthesis gas to the ammonia synthesis catalyst, and purging sufficient gas from the recycle stream to maintain a desired concentration of methane and other inerts in the stream flowing to the ammonia synthesis catalyst, a method for minimizing hydrogen losses in the methanation step and hydrogen and ammonia losses in the purge step while at the same time minimizing the steam required by such $CO_2$ removal and CO shift conversion steps which comprise the steps of:

a. Converting from 90 to 99% of the carbon monoxide in said carbon monoxide-hydrogen mixture to hydrogen and $CO_2$ by reaction of said carbon monoxide with water in at least two successive catalytic shift conversion zones, the last of which operates in the temperature range of from 350° to 550°F;

b. Removing carbon dioxide from the mixture produced in Step (a) in a first $CO_2$ scrubbing zone to provide a gas mixture containing not more than about 2% and not less than about 0.1% $CO_2$, the $CO_2$ removal in said first zone being carried out by contacting said mixture with a scrubbing solution comprising an aqueous solution of potassium carbonate, wherein at least the major portion of said scrubbing is carried out at a scrubbing solution temperature in the vicinity of the atmospheric boiling temperature of said solution, and wherein the regeneration of said scrubbing solution is carried out at a reduced pressure by steam stripping thereof, whereby the bulk of said $CO_2$ is removed with a minimum consumption of stripping steam;

c. Subjecting the gas mixture produced in Step (b) to catalytic shift conversion at a temperature in the range of from 350° to 550°F to convert residual carbon monoxide to hydrogen and carbon dioxide to produce a gas stream containing not more than 0.1% residual carbon monoxide;

d. Removing $CO_2$ from the gas mixture produced in Step (c) in a second $CO_2$ scrubbing zone to provide a mixture containing not more than about 200 ppm of residual $CO_2$, the $CO_2$ removal in said second zone being carried out by contacting said gas mixture with a scrubbing solution comprising an aqueous solution of an alkaline chemical absorbent wherein said scrubbing is carried out at an absorption temperature of from 90° to 140°F permitting the reduction of residual $CO_2$ in said mixture at least to said level of 200 ppm and wherein the regeneration of said scrubbing solution is carried out by steam stripping thereof;

e. Converting the residual carbon monoxide and carbon dioxide in the gas mixture from Step (d) to methane in a catalytic methanation zone, and thereafter introducing said gas mixture into an ammonia synthesis loop including a purge for preventing the build-up of inert gases in said loop.

2. A process in accordance with claim 1 in which the steam for the steam stripping of said scrubbing solutions in Steps (b) and (d) is supplied by transferring heat present in said gas mixture to said scrubbing solutions.

3. A method in accordance with claim 1 in which the process gas stream is heated and saturated with water prior to the final low temperature shift conversion in Step (c) by direct contact with a circulating stream of water which is heated in turn by direct contact betwen the circulating water stream and the hot process gas.

4. A method in accordance with claim 1 wherein the hot process gas leaving Step (a) is cooled prior to Step (b) by direct contact with a circulating stream of water and wherein the heated water thereby generated is utilized to heat and saturate the process gas stream leaving Step (b) by directly contacting such process gas stream with said heated water prior to introducing said mixture into the final low temperature shift conversion zone in Step (c).

5. A method in accordance with claim 1 in which from 95% to 98% of the carbon monoxide in the carbon monoxide-hydrogen mixture is converted to hydrogen and $CO_2$ in Step (a).

6. A method in accordance with claim 1 in which the removal of carbon dioxide in Step (b) is carried out to provide a gas mixture containing not more than about 1% and not less than about 0.2% $CO_2$.

7. A method in accordance with claim 1 in which the $CO_2$ removal in Step (d) is carried out to provide a mixture containing not more than about 100 ppm of residual $CO_2$.

8. A method in accordance with claim 1 in which the temperature of the last shift conversion in Step (a), and the temperature of the shift conversion in Step (c) is in the range of from 400° to 500°F.

9. A method in accordance with claim 1 in which the absorption temperature in Step (b) is in the range of from 220° to 250°F.

10. A method in accordance with claim 1 in which the absorption temperature in Step (d) is in the range of from 100° to 130°F.

11. A method in accordance with claim 1 in which the scrubbing solution employed in Step (d) is an aqueous solution of an alkanolamine.

12. In a process for the synthesis of ammonia from a hydrocarbon starting material involving the steps of generating under superatmospheric pressure a mixture comprising carbon monoxide and hydrogen from said hydrocarbon, converting the carbon monoxide in said mixture to hydrogen and $CO_2$ by reaction with water through catalytic shift conversion, removing said $CO_2$ from said mixture by absorption in a liquid scrubbing medium which is regenerated by steam stripping, converting residual CO and $CO_2$ to methane by reaction with hydrogen over a methanation catalyst, compressing said hydrogen together with nitrogen in about the molar ratio required for ammonia synthesis, passing said compressed mixture over an ammonia synthesis catalyst, recycling unconverted synthesis gas to the ammonia synthesis catalyst, and purging sufficient gas from the recycle stream to maintain a desired concentration of methane and other inerts in the stream flowing to the ammonia synthesis catalyst, a method for minimizing hydrogen losses in the methanation step and hydrogen and ammonia losses in the purge step while at the same time minimizing the steam required by such $CO_2$ removal and CO shift conversion steps which comprise the steps of:

a. Converting from 95 to 98% of the carbon monoxide in said carbon monoxide-hydrogen mixture to hydrogen and $CO_2$ by reaction of said carbon monoxide with water in at least two successive catalytic shift conversion zones, the last of which operates in the temperature range of from 400° to 500°F;

b. Removing carbon dioxide from the mixture produced in Step (a) in a first $CO_2$ scrubbing zone to provide a gas mixture containing not more than about 1% and not less than about 0.2% $CO_2$, the $CO_2$ removal in said first zone being carried out by contacting said mixture with a scrubbing solution comprising an aqueous solution of potassium carbonate, wherein at least the major portion of said scrubbing is carried out at a scrubbing solution temperature in the vicinity of the atmospheric boiling temperature of said solution, and wherein the regeneration of said scrubbing solution is carried out at a reduced pressure by steam stripping thereof, whereby the bulk of said $CO_2$ is removed with a minimum consumption of stripping steam;

c. Subjecting the gas mixture produced in Step (b) to catalytic shift conversion at a temperature in the range of from 400° to 500°F to convert residual carbon monoxide to hydrogen and carbon dioxide to produce a gas stream containing not more than 0.05% residual carbon monoxide;

d. Removing $CO_2$ from the gas mixture produced in Step (c) in a second $CO_2$ scrubbing zone to provide a mixture containing not more than about 100 ppm of residual $CO_2$, the $CO_2$ removal in said second zone being carried out by contacting said gas mixture with a scrubbing solution comprising an aqueous solution of an alkaline chemical absorbent wherein said scrubbing is carried out at an absorption temperature of from 90° to 140°F permitting the reduction of residual $CO_2$ in said mixture at least to said level of 100 ppm and wherein the regeneration of said scrubbing solution is carried out by steam stripping thereof;

e. Converting the residual carbon monoxide and carbon dioxide in the gas mixture from Step (d) to methane in a catalytic methanation zone, and thereafter introducing said gas mixture into an ammonia synthesis loop including a purge for preventing the build-up of inert gases in said loop.

* * * * *